(12) United States Patent
Rosenberg et al.

(10) Patent No.: US 10,806,127 B2
(45) Date of Patent: Oct. 20, 2020

(54) BOXED PET TOY

(71) Applicant: WORLDWISE, INC., Novato, CA (US)

(72) Inventors: Hannah Rosenberg, San Francisco, CA (US); Victoria Davila, San Francisco, CA (US); Charles Floyd, Oakland, CA (US)

(73) Assignee: Worldwise, Inc., Novato, CA (US)

( * ) Notice: Subject to any disclaimer, the term of this patent is extended or adjusted under 35 U.S.C. 154(b) by 871 days.

(21) Appl. No.: 15/204,828

(22) Filed: Jul. 7, 2016

(65) Prior Publication Data
US 2018/0007867 A1  Jan. 11, 2018

(51) Int. Cl.
*A01K 15/02* (2006.01)
*B65D 5/36* (2006.01)
*B65D 5/42* (2006.01)

(52) U.S. Cl.
CPC ............. *A01K 15/025* (2013.01); *B65D 5/36* (2013.01); *B65D 5/4266* (2013.01); *G05B 2219/2666* (2013.01)

(58) Field of Classification Search
CPC .................................................. A01K 15/025
USPC ...................................... 446/71, 73, 75, 168
See application file for complete search history.

(56) References Cited

U.S. PATENT DOCUMENTS

| | | | |
|---|---|---|---|
| 3,648,403 A * | 3/1972 | Gommel | A63H 33/00 446/491 |
| 5,014,649 A * | 5/1991 | Taft | A01K 1/0125 119/168 |
| 5,045,014 A | 9/1991 | Harkins | |
| 5,188,059 A * | 2/1993 | Rice | A01K 1/0353 119/28.5 |
| 5,297,981 A * | 3/1994 | Maxim | A63H 33/005 446/437 |
| 5,536,007 A * | 7/1996 | Snyder | A63F 7/04 119/702 |
| 5,572,951 A * | 11/1996 | Evans | A01K 1/0125 119/168 |
| 5,579,725 A * | 12/1996 | Boshears | A01K 15/025 119/706 |

(Continued)

FOREIGN PATENT DOCUMENTS

JP       10117623 A  *  5/1998

*Primary Examiner* — Marc Burgess
(74) *Attorney, Agent, or Firm* — Bay Area Technology Law Group PC

(57) ABSTRACT

A pet toy, in combination, including a containment structure having a longitudinal axis and cross section defining an interior volume. The containment structure, which is preferably collapsible, includes a plurality of containment openings along its longitudinal axis exposing the interior volume to a pet during use of the pet toy, and an electronic component in the form of a hollow shell having a shell opening configured therein. A motor having a rotatable shaft extends toward the opening. A power supply for powering the motor and optional microprocessor, the motor, microprocessor and power supply being supported within the interior of the hollow shell. An attractant is affixed to the rotatable shaft and extends through the shell opening, the microprocessor being programmed to control operation of the motor to cause the attractant to rotate intermittently, the electronic component and attractant being visible to a pet during use of the pet toy.

16 Claims, 2 Drawing Sheets

(56) References Cited

U.S. PATENT DOCUMENTS

| | | | | |
|---|---|---|---|---|
| 5,870,971 | A * | 2/1999 | Krietzman | A01K 15/025 |
| | | | | 119/707 |
| 5,934,968 | A * | 8/1999 | Lin | A63H 33/005 |
| | | | | 446/358 |
| 6,058,887 | A | 5/2000 | Silverman | |
| 6,227,933 | B1 * | 5/2001 | Michaud | A63H 33/005 |
| | | | | 446/458 |
| 6,629,510 | B1 * | 10/2003 | Robkin | A01K 15/025 |
| | | | | 119/707 |
| 6,892,675 | B1 | 5/2005 | Comerford | |
| 6,964,572 | B2 * | 11/2005 | Cesa | A63H 11/00 |
| | | | | 434/258 |
| 7,320,296 | B2 * | 1/2008 | Morrison | A01K 15/025 |
| | | | | 119/707 |
| 7,823,541 | B2 * | 11/2010 | Comerford | A01K 15/025 |
| | | | | 119/707 |
| 8,011,326 | B2 | 9/2011 | Del Pinal et al. | |
| 8,225,747 | B2 | 7/2012 | Markham et al. | |
| 8,894,465 | B2 * | 11/2014 | McClintock | A63H 11/02 |
| | | | | 446/431 |
| 2005/0161004 | A1 | 7/2005 | Ritchey | |
| 2012/0234258 | A1 * | 9/2012 | Cook | A01K 15/025 |
| | | | | 119/708 |
| 2016/0302388 | A1 * | 10/2016 | Floyd | A01K 15/024 |

* cited by examiner

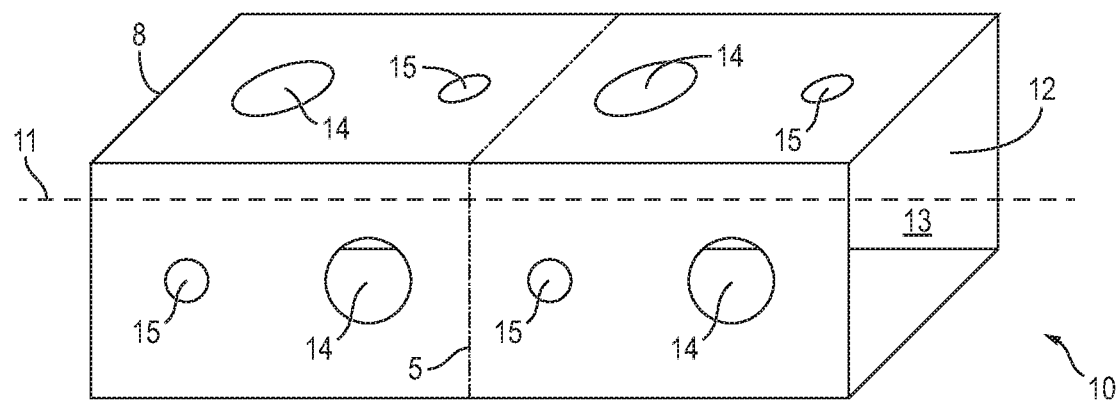
FIG. 1
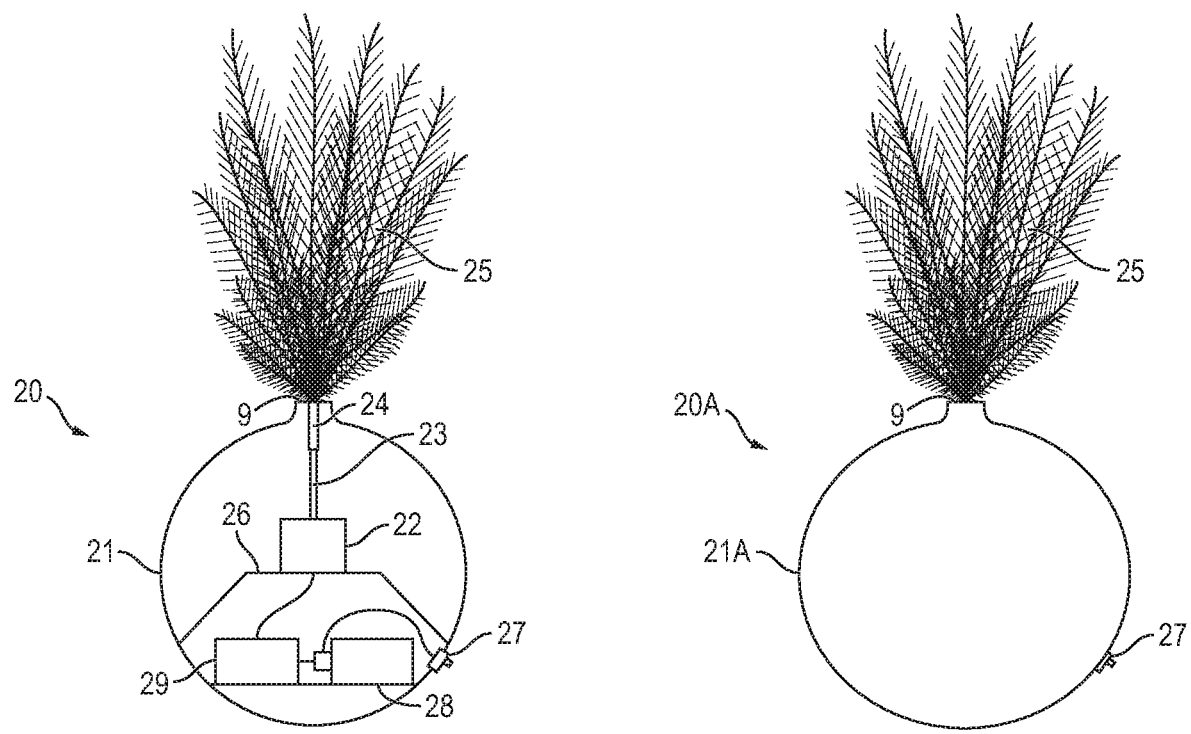
FIG. 2A
FIG. 2B

BOXED PET TOY

TECHNICAL FIELD

The present invention involves a cat attracting toy capable of amusing and occupying a domestic cat for extended periods of time and without the need for significant human intervention.

BACKGROUND OF THE INVENTION

It is well known that pet cats require stimulation. Without it, they get bored which could result in health problems and associated unwelcome anti-social behavior. It is also well known to anyone owning a pet cat that they express a natural instinct to hunt and to pounce upon moving objects and can be mesmerized by them. This stems from their instinctual need to chase prey. As such, cat owners often times dangle attractants in front of their pets observing as the pet swats and even pounces upon it.

Pet owners have recognized the need for a toy which could move an attractant, such as a feathered bundle, in a somewhat haphazard path to provide stimulation. For example, such a device is disclosed in U.S. Pat. No. 6,892,675. However the device made the subject of the '675 patent is quite complex requiring extended feet to stabilize the device and a rotating shaft maintained in its own hollow housing to move the attractant. However, if a cat was to pounce upon this device it could well tip over from its vertical orientation, and would be incapable of functioning further until the pet owner, realizing that the device was knocked over, uprighted it for further use.

It is thus an object of the present invention to provide an attractant such as a feathered bundle to a pet cat while, at the same time, minimizing the cat's ability to grab, bite upon or otherwise degrade it during active play.

It is yet a further object of the present invention to provide a cat attractant having the attributes sought after by the pet owner while minimizing damage which a cat can inflict upon the toy.

These and further objects will be more readily apparent when considering the following disclosure and appended claims.

SUMMARY OF THE INVENTION

A pet toy, in combination, comprising:
a containment structure having a longitudinal axis and cross section defining an interior volume, said containment structure, which is preferably collapsible, comprising a plurality of containment openings along said longitudinal axis exposing said interior volume to a pet during use of said pet toy; and
an electronic component comprising a hollow shell having a shell opening configured therein, a motor having a rotatable shaft extending toward said shell opening and a power supply for powering said motor, said motor and power supply being supported within the interior of said hollow shell, an attractant being affixed to said rotatable shaft and extending through said shell opening, said electronic component and said attractant being visible to a pet during use of the pet toy.

A pet toy, in combination, comprising:
a containment structure having a longitudinal axis and square or rectangular cross-section defining an interior volume, said containment structure, which is preferably collapsible, comprising a plurality of containment openings along said longitudinal axis exposing said interior volume to a pet during use of said pet toy; and
an electronic component comprising a substantially spherical or oval hollow shell having an opening configured therein, a motor having a rotatable shaft extending toward said opening and power supply for powering said motor, said motor and power supply being supported within the interior of said hollow shell, an attractant in the form of a feathered bundle being affixed to said rotatable shaft and extending through said shell opening vertically and substantially orthogonally to said longitudinal axis, wherein rotation of said attractant causes said hollow shell to move haphazardly within said interior volume.

BRIEF DESCRIPTION OF THE FIGURES

FIG. 1 is a perspective view of the containment structure of the present invention.

FIGS. 2A and 2B are side views of the electronic component of the present invention.

DETAILED DESCRIPTION OF THE INVENTION

Figure 3:
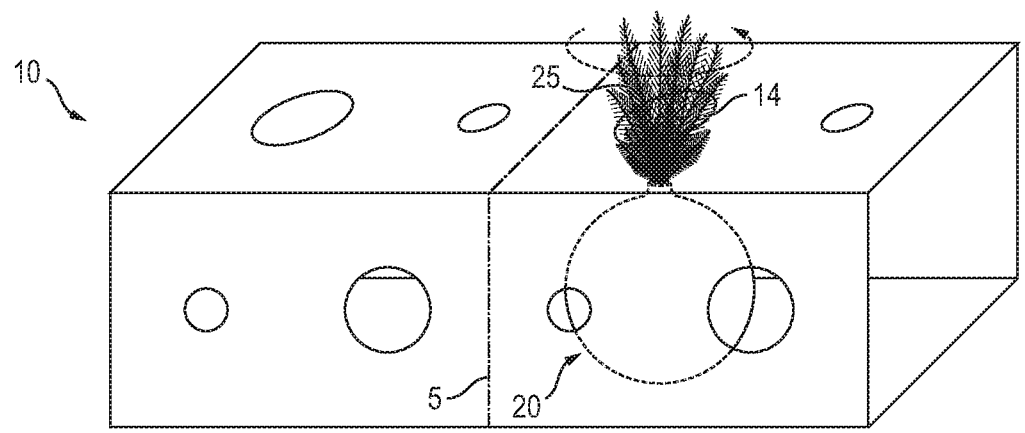
FIG. 3 is a perspective view of the combination of containment structure and electronic component constituting the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

The present pet toy is fabricated from the combination of containment structure 10 and electronic component 20/20A.

In turning first to FIG. 1, containment structure 10 is characterized as having longitudinal axis 11 and a cross-section, preferably square or rectangular creating interior volume 13. Containment structure 10 is further characterized as having a plurality of containment openings 14 and 15 which can be the same or, as shown, of different sizes each preferably being circular which expose interior volume 13 to a pet during use of the pet toy. In addition, containment structure 10 includes fold line or strategically placed cuts 5 to facilitation its collapse providing for a more compact package during shipment and storage.

As noted, the pet toy of the present invention also includes electronic component 20/20A comprising hollow shells 21 and 21A, shell 21 being substantially spherical and shell 21A being oval and each having shell opening 9 configured therein. Motor 22 having rotatable shaft 23 extends toward shell opening 9, electronic component 20 also including power supply 28 for powering motor 22, the powering of motor 22 by power supply 28 being interrupted by user—controllable switch 27 to preserve power supply 28 which can be in the form of replaceable or rechargeable batteries or the like. Optionally, to maintain the orientation of motor 22 and its rotatable shaft 23 as shown, motor 22 can be supported by platform 26 within the interior of shell 21.

Electronic component 20/20A is optionally provided with microprocessor 29 placed between power supply 28 and motor 22. Microprocessor 29 is programmed to control operation of motor 22 to cause motor 22 to operate intermittently which, in turn, results in motor shaft 23 and attractant 25 to rotate intermittently. Attractant 25, optimally in the form of a feathered bundle, is affixed to rotatable shaft 23 by connector 24 resulting in attractant 25 extending through shell opening 9 as shown.

As noted in reference to FIG. 3, electronic component 20 is placed within containment structure 10. Ideally, containment structure 10 is closed on first end 8 of longitudinal axis 11 and open at second end 12 of longitudinal axis 11 facilitating the placement of electronic component 20 through the containment structure's open end.

Once switch 27 is activated, motor 22 causes rotation of rotatable shaft 23 which, in turn, intermittently spins attractant 25. The orientation of electronic component 20 is biased by the placement of power source 28 and microprocessor 29 such that, at rest, rotatable shaft 23 extends vertically and orthogonally to longitudinal axis 11. Once motor 22 is activated, because attractant 25 is not geometrically centered above rotatable shaft 23, the spinning of attractant 25 causes hollow shell 21 or 21A to move erratically and haphazardly. Furthermore, during normal use, attractant 25, which is preferably, but not necessarily a feathered bundle, intermittently extends through openings 14 and 15 which, together, stimulate a cat's hunting and prey instinct. The engaged pet will make every attempt to reach the electronic component and attractant but because of the containment structure, access is limited causing the pet to become further engaged. The containment structure, preferably composed of cardboard or chipboard, additionally acts to shelter the electronic component and attractant thus protecting them from damage resulting from abusive play.

Figure 4:
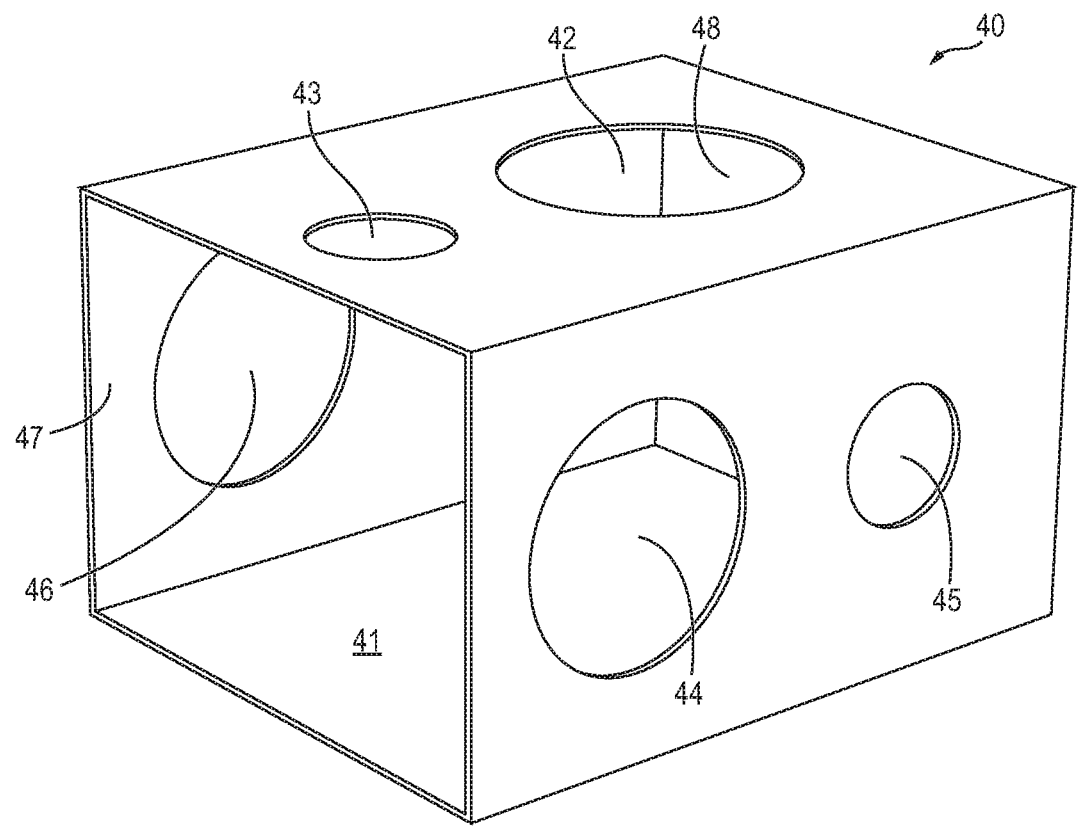
FIG. 4 is a perspective view of yet another containment structure useful in practicing the present invention.

It should be noted that although reference has been made to containment structure 10 as depicted in FIGS. 1 and 3, any suitable containment structure, even one having a different geometry, can be employed in practicing the present invention as long as suitable containment openings are provided and a volume is established for receiving electronic component 20/20A and for allowing its erratic motion therein. As a further illustrative example, reference is made to FIG. 4 depicting box-like structure 40 having openings 42, 43, 44, 45 and 46 corresponding to openings 14 and 15 of containment structure 10. Interior volume 41 is established by the sidewalls of containment structure 40 which can further be characterized as having open end 47 for insertion and removal of electronic component 20/20A and closed end 48 to maintain the electronic component therein and to inhibit its removal by an engaged pet.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A pet toy, in combination, comprising:
   a containment structure having a longitudinal axis and cross section defining an interior volume, said containment structure comprising a plurality of containment openings along said longitudinal axis exposing said interior volume to a pet during use of said pet toy; and
   an electronic component comprising a hollow shell having a shell opening configured therein, a motor having a rotatable shaft extending toward said shell opening and a power supply for powering said motor, said motor and power supply being supported within the interior of said hollow shell, an attractant being affixed to said rotatable shaft and extending through said shell opening, said electronic component and said attractant being visible to a pet during use of the pet toy and wherein, in use, said pet toy is configured such that said attractant intermittently extends through said plurality of containment openings.

2. The pet toy of claim 1 further comprising a microprocessor, said motor being powered by said power supply through said microprocessor, said microprocessor being programmed to control operation of said motor to cause said attractant to rotate intermittently, erratically and haphazardly.

3. The pet toy of claim 1 wherein said hollow shell is spherical.

4. The pet toy of claim 1 wherein said hollow shell is oval.

5. The pet toy of claim 1 wherein said rotatable shaft and attractant extend vertically and substantially orthogonally to said longitudinal axis.

6. The pet toy of claim 1 wherein said pet toy is configured such that rotation of said attractant causes said hollow shell to move haphazardly within said interior volume.

7. The pet toy of claim 1 wherein said cross-section is substantially square or rectangular.

8. The pet toy of claim 1 wherein said containment structure is closed on a first end of said longitudinal axis and open on a second end of said longitudinal axis.

9. The pet toy of claim 1 wherein said containment structure comprises cardboard.

10. The pet toy of claim 1 wherein said containment structure further comprises a fold line to facilitate its collapse during shipment and storage.

11. The pet toy of claim 1 wherein said attractant comprises a feathered bundle.

12. A pet toy, in combination, comprising:
- a containment structure having a longitudinal axis and square or rectangular cross-section defining an interior volume, said containment structure comprising a plurality of containment openings along said longitudinal axis exposing said interior volume to a pet during use of said pet toy; and
- an electronic component comprising a substantially spherical hollow shell having an opening configured therein, a motor having a rotatable shaft extending toward said opening and power supply for powering said motor, said motor and power supply being supported within the interior of said hollow shell, an attractant in the form of a feathered bundle being affixed to said rotatable shaft and intermittently extending through said shell opening vertically and substantially orthogonally to said longitudinal axis, wherein said pet toy is configured such that rotation of said attractant causes said hollow shell to move haphazardly within said interior volume.

13. The pet toy of claim 12 wherein said containment structure is closed on a first end of said longitudinal axis and open on a second end of said longitudinal axis.

14. The pet toy of claim 13 wherein said containment structure comprises cardboard.

15. The pet toy of claim 12 further comprising a microprocessor, said motor being powered by said power supply through said microprocessor, said microprocessor being programmed to control operation of said motor to cause said attractant to rotate intermittently.

16. The pet toy of claim 12 wherein said containment structure further comprises a fold line to facilitate its collapse during shipment and storage.

* * * * *